United States Patent
Nagano et al.

(10) Patent No.: US 8,092,701 B2
(45) Date of Patent: Jan. 10, 2012

(54) GRATING, NEGATIVE AND REPLICA GRATINGS OF THE GRATING, AND METHOD OF MANUFACTURING THE SAME

(75) Inventors: Tetsuya Nagano, Osaka (JP); Masaru Koeda, Kyoto (JP); Makoto Sato, Kyoto (JP); Akira Sato, Kyoto (JP); Shinji Miyauchi, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 972 days.

(21) Appl. No.: 11/948,133

(22) Filed: Nov. 30, 2007

(65) Prior Publication Data

US 2008/0088930 A1    Apr. 17, 2008

Related U.S. Application Data

(63) Continuation of application No. 11/420,932, filed on May 30, 2006, now abandoned, and a continuation of application No. 10/034,073, filed on Dec. 28, 2001, now abandoned.

(51) Int. Cl.
*B44C 1/22* (2006.01)
(52) U.S. Cl. .......... 216/31; 216/41; 216/58; 216/66; 430/321; 250/492.3
(58) Field of Classification Search ........... 216/31, 216/41, 58, 66; 430/321
See application file for complete search history.

(56) References Cited

U.S. PATENT DOCUMENTS

| | | | |
|---|---|---|---|
| 4,670,095 A | | 6/1987 | Negishi |
| 4,842,633 A | * | 6/1989 | Kuribayashi et al. ............. 65/44 |
| 4,842,969 A | * | 6/1989 | Kawatsuki et al. .............. 430/5 |
| 5,007,709 A | | 4/1991 | Iida et al. |
| 5,234,537 A | * | 8/1993 | Nagano et al. ................ 216/67 |
| 5,280,388 A | | 1/1994 | Okayama et al. |
| 5,291,318 A | | 3/1994 | Genovese |
| 5,335,113 A | * | 8/1994 | Jackson et al. ............... 359/569 |
| 5,363,238 A | * | 11/1994 | Akune et al. ................. 359/566 |
| 5,444,567 A | | 8/1995 | Kataoka |
| 6,099,146 A | | 8/2000 | Imamura et al. |
| 7,114,820 B1 | | 10/2006 | Parikka et al. |

FOREIGN PATENT DOCUMENTS

JP    6-338443    * 12/1994
JP    63-068802     3/1998

* cited by examiner

*Primary Examiner* — Shamim Ahmed
(74) *Attorney, Agent, or Firm* — Rankin, Hill & Clark LLP

(57) ABSTRACT

A grating of the present invention has a groove cross section shaped, for example, like a sinusoidal wave or a sawtooth other than a laminar shape, and a groove bottom part shaped as a flat form. In a region wherein the groove cycle and the used wavelength are the same degree for wavelengths from near infrared to infrared, the grating of the present invention has the excellent spectrum performance (high efficiency in balance in a wide wavelength zone) more than a holographic grating and an echellette grating in related arts. When replicas for the grating of the present invention are manufactured, the engagement force of grooves with each other is small as the groove aspect ratio is small, and a release agent sufficiently reaches the groove bottom as the groove bottom is large.

7 Claims, 6 Drawing Sheets

Ar/(CF$_4$+Ar)=60% ION BEAM

GRATING, NEGATIVE AND REPLICA GRATINGS OF THE GRATING, AND METHOD OF MANUFACTURING THE SAME

CROSS-REFERENCE TO RELATED APPLICATIONS

The instant application is a continuation of U.S. application Ser. No. 10/034,073 filed on Dec. 28, 2001 (now abandoned) and U.S. application Ser. No. 11/420,932, filed on May 30, 2006 (now abandoned).

BACKGROUND OF THE INVENTION

1. Field of the Invention

The present invention relates to a grating as a wavelength separation/selection element used in a spectroscope or a branching filter, and negative and replica gratings manufactured by transfer from the grating and methods of manufacturing these gratings.

2. Description of the Related Art

A grating is a wavelength separation/selection element used in a spectroscope, a branching filter, etc. The known gratings are roughly classified according to the groove cross-section shape into (1) a holographic grating, (2) a brazed holographic grating or a ruled grating, and (3) a laminar grating. The holographic grating is manufactured by exposing and developing interferential fringes formed by two luminous flux interference (holographic exposure method) onto a photoresist layer coated on a substrate. The holographic grating has a resist pattern with the groove cross section shaped like a sinusoidal wave. The grating with the groove cross section shaped like the sinusoidal wave will be hereinafter referred to as holographic grating. The brazed holographic grating is manufactured by converting the groove cross-section shape of the (1) holographic grating into a sawtooth shape by an ion beam machining technique. The ruled grating has the groove cross section shaped like a sawtooth, ruled by a ruling engine, etc. The gratings each with the groove cross section shaped like the sawtooth will be hereinafter referred to collectively as echellette gratings. The laminar grating is manufactured by converting the groove cross-section shape of the (1) holographic grating into a rectangle shape by the ion beam machining technique.

Light is a transverse wave having two components of an electric wave and a magnetic wave which run at right angles to one another. Essentially the action in the boundary region between the electric wave and the magnetic wave varies. Therefore, to obtain the diffraction efficiency of the grating, it is necessary to separate the light incident on the grating into a component vibrating in parallel to the groove direction and a component vibrating perpendicular to the groove direction, and calculate the action on the grating groove surface for each of the components. However, if the used wavelength in light is small relative to the groove cycle of the grating, without discussion with the incident light separated into the two components, only the strength of light, namely, Fraunhofer diffraction of each grating groove is integrated with every grating groove, whereby the diffraction efficiency is simply calculated and a good match with the actual one can be provided. This calculation theory is called scalar theory. According to the theory, a good calculation result well matching the actual one can be provided.

A region of groove cycle/wavelength>5 (the groove cycle relative to the wavelength being more than 5) is called scalar domain. Fraunhofer diffraction to which each grating groove contributes is integrated, whereby the diffraction efficiency can be calculated. In the scalar domain, the difference caused by polarization in the spectrum shape is small.

In contrast, a region of groove cycle/wavelength<5 (the groove cycle relative to the wavelength being less than 5) is called resonance domain and the scalar theory does not hold. In the resonance domain, the action in the boundary region depending on polarization varies. Thus, to obtain the diffraction efficiency, the action on the grating groove surface needs to be strictly calculated with the light incident on the grating as vector quantity.

Generally, for spectrum of a short wavelength such as radiation, the laminar grating with the groove cross section shaped like the rectangle is often used. For a spectroscope of an analyzer of wavelengths from ultraviolet to near infrared, the echellette grating with the groove cross section shaped like the sawtooth is mainly used. Although there are various reasons, a groove shape with the optimum diffraction efficiency mainly depends on the used wavelength zone, the grating use method, etc. In the scalar domain, the calculation result based on the scalar theory matches the actual one comparatively well. However, in the resonance domain wherein the groove cycle and the wavelength become the same degree for wavelengths from near infrared to infrared, the holographic grating with the groove cross section shaped like the sinusoidal wave is often used because it may be excellent in diffraction efficiency more than the echellette grating.

Replica gratings are generally mass-produced as follows: A thin oil film or a metal film which has a weak adhesion force such as gold or platinum, as a release agent is formed on a grating face of a negative grating. An aluminum thin film is formed thereon by vacuum evaporation. Then a replica substrate (glass substrate) is bonded onto the aluminum thin film with an adhesive. After the adhesive is hardened, the glass substrate is parted from a master block (negative grating). The aluminum thin film is parted from the master block together with the glass substrate. Consequently, the replica grating to which the grating grooves of the negative grating are transferred can be provided.

When the grating is manufactured, if an attempt is made to provide a resolution in the used wavelength zone, it is necessary to increase the number of grooves of the grating (lessen the groove cycle). When the groove cycle and the used wavelength become the same degree, the groove depth relative to the groove cycle (aspect ratio) needs to be made large. However, as for the holographic grating, it is difficult to produce good-contrast interferential fringes stably during exposure because the groove cross section of the interferential fringe at the exposure is shaped like the sinusoidal wave, and there are disturbance of vibration, heat, etc., at the exposure. Thus, a resist pattern with a deep groove depth cannot be formed. Consequently, holographic gratings or brazed holographic gratings each with a deep groove depth cannot be manufactured.

When a holographic grating or an echellette grating with a reasonably large aspect ratio in the range in which the grating can be manufactured is replicated, a release agent is not effectively put on the groove surface and breakage easily occurs at the parting stage. For example, at the parting, grating grooves are chipped or the groove shape is not faithfully transferred and thus the performance of the grating is degraded, namely, often the manufacturing efficiency worsens extremely. To avoid such a problem in the parting stage, a small aspect ratio and an easy-to-part shape are desired. However, to attempt to obtain a high resolution for a grating used particularly in wavelengths from near infrared to infrared, the aspect ratio becomes large, and the absolute groove depth also becomes deep; the above-described problem is more conspicuous.

Further, for the holographic grating and the echellette grating, in the resonance domain, even if the aspect ratio is made large, the peak remains on the short wavelength side. Thus, it is also difficult in theory to bring the peak into any desired wavelength. Therefore, it is difficult to form a reflection (transmission) band having sufficient diffraction efficiency in a nearby wavelength zone for the used wavelength.

SUMMARY OF THE INVENTION

It is therefore an object of the invention to provide a grating having high diffraction efficiency in a wide wavelength region, particularly in the resonance domain and fitted for manufacturing replicas, and negative and replica gratings manufactured by transfer from the grating and methods of manufacturing these gratings.

The inventors paid attention to the fact that different types of gratings are used depending on the application of used wavelength zone, etc. As a result of diligent research, the inventors found a groove cross-section shape that can solve the above-described problems, excellent in diffraction efficiency while considering a manufacturing method based on the groove cross-section shape in the related art.

According to calculation, for wavelengths from near infrared to infrared, the holographic grating is excellent more than the echellette grating in the domain in which the groove cycle and the wavelength are the same degree. In a replica of the grating, the smaller the groove aspect ratio, the smaller the engagement force of grooves with each other, and the larger the groove bottom, the more sufficient a release agent reaching the groove bottom. As the groove shape satisfying the conditions, the grating according to the invention has a groove cross section shaped like a sawtooth, a sinusoidal wave, etc., for example other than like a laminar shape (a rectangle), and a groove bottom part shaped as a flat form. That is, the grating according to the invention has a groove cross section of a half sawtooth, a half sinusoidal wave, a half sawtooth with a flat top, etc.

Simulation of diffraction efficiency was conducted for the grating of the present invention having such groove cross-section shapes. It was found that the grating of the present invention can obtain the high diffraction efficiency formerly unable to be provided in the echellette grating or the holographic grating in the related art in any desired wavelength zone. It was also found that the diffraction efficiency obtained by the simulation can be matched well the diffraction efficiency measurement result of the actually manufactured grating; a good effective result can be provided.

The groove cross-section shape as a base may be any other than a laminar shape, such as a sawtooth shape, a sinusoidal wave, or a shape provided by a little modifying the sawtooth shape or the sinusoidal wave if the grating has a flat part in the groove bottom part. The grating may be of reflection type or transmission type.

DETAILED DESCRIPTION OF THE INVENTION

A manufacturing method and a replicating method of a grating according to the invention will be discussed by taking a grating with the groove cross section shaped like a sinusoidal wave as an example.

Figure 1A:
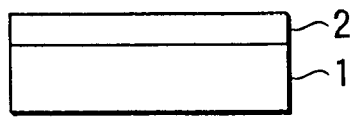
FIGS. 1A to 1H are schematic drawings to describe an embodiment to manufacture a holographic grating and a replica grating according to the present invention.

In FIG. 1A, numeral 1 denotes a substrate made of optical glass. The substrate is an original blank of a grating and may be any if it can be optically ground and a resist can be applied on it. The optical glass has a low expansion coefficient caused by thermal change and is excellent as a substrate material of a grating as an optical element. For example, low-expansion crystal glass such as BK7, BSC2, pyrex glass, soda glass, quartz glass, Zerodure (manufactured by SCHOTT), or crystron (manufactured by HOYA Co. Ltd.) can be well used. In the embodiment, BK7 glass is adopted as an example. First, BK7 glass (about 60 mm×60 mm×11.3 mm) is optically ground to form a concave substrate and the surface is cleaned by ultrasonic cleaning.

Next, a photoresist layer 2 is formed on the surface of the substrate 1. The photoresist may be any if it enables holographic exposure. For example, MP1400 (manufactured by Shifurei), OFPR5000 (manufactured by Tokyo Ouka), etc., can be used. In the embodiment, MP1400-22 was spin-coated for 40 seconds at 3000 rpm and then was baked at 90° C. for 30 minutes in a convection oven to form the photoresist layer 2 with 400 nm thick.

Figure 1B:
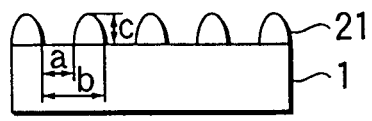
Figure 2:
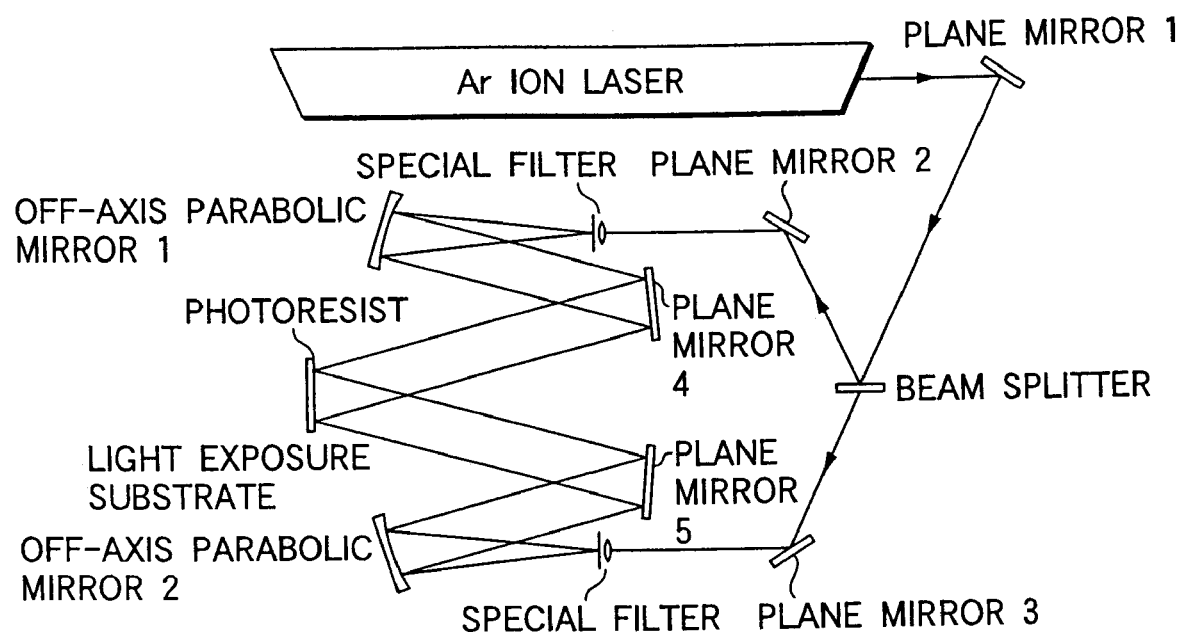
FIG. 2 is a schematic drawing to describe a configuration example of a holographic exposure apparatus.

The workpiece in FIG. 1A thus provided is set in a holographic exposure apparatus as shown in FIG. 2. A grating pattern of photoresist (FIG. 1B) is formed by exposing a latent image of 900 interferential fringes per mm onto the photoresist by a holographic exposure method of two luminous flux interference with He—Cd laser ($\lambda$=441.6 nm), for example, and then performing the development by a dedicated developer and the rinse by pure water. At this time, the strength distribution of the interferential fringes produced by two luminous flux interference is a sinusoidal wave, but a grating pattern 21 of photoresist shaped like a half sinusoidal wave can be formed on the substrate surface by controlling the exposure time and the development time. In the embodiment, the duty ratio (groove width a/groove cycle b) was 0.5. A groove depth c of the grating pattern 21 of photoresist (amplitude shaped like a sinusoidal wave) can also be determined by controlling the exposure time and the developing time; in the embodiment, it was 300 nm.

Figure 1C:
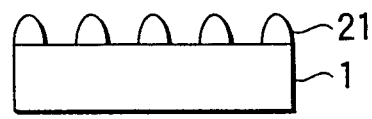
Figure 1D:

Next, a reactive ion beam etching is performed (FIG. 1C). As used etching gas, the mix ratio of $CF_4$ and Ar gas is $Ar/(CF_4+Ar)$=60% and the gas pressure is $2 \times 10^{-2}$ Pa, and an ion beam was applied from the normal direction of the substrate. The etching was continued for about 10 minutes until the resist pattern was disappeared and the pattern was completely engraved directly on the BK7 glass substrate 1. Thus, a grating with the groove cross section shaped like the half sinusoidal wave with the groove depth 400 nm and the duty ratio 0.5 (FIG. 1D) can be obtained.

The mix ratio of $CF_4$ and Ar of the used etching gas is determined by the initially produced resist pattern and any desired grating groove depth. Thus, it is not limited to that in the embodiment described above. The optimum value may be selected each time in the range of $Ar/(CF_4+Ar)=0.1$ to 0.9. The used etching gas is not limited to mix gas of $CF_4$ and Ar either and may be mix gas of $CF_4$ and $O_2$, or fluorine family gas, such as $CHF_3$ or $CBRF_3$ and Ar or $O_2$. The incident direction of the ion beam is not limited to direct incidence (0 degrees) either. In short, the purpose is to provide the groove depth for providing the optimum diffraction efficiency of the grating to be finally provided.

As for the grating thus manufactured, when it has the number of grooves of 900 per mm and the groove depth of 400 nm, in a 1.55-µm band, TE polarization becomes 40% and TM polarization becomes 95%; the grating is fitted for use with optical communication application, for example. As for the gratings in the related art, which has the same groove depth of 400 nm, when the grating is a brazed grating with the grating grooves shaped like a sawtooth, TE polarization becomes 17% and TM polarization becomes 80%, and when the grating is holographic grating, TE polarization becomes 22% and TM polarization becomes 94%. Therefore, the holographic grating of flat bottom type manufactured in this embodiment of the present invention shows extremely excellent diffraction efficiency as compared with the echellette grating and the holographic grating in the related art.

Figure 3:
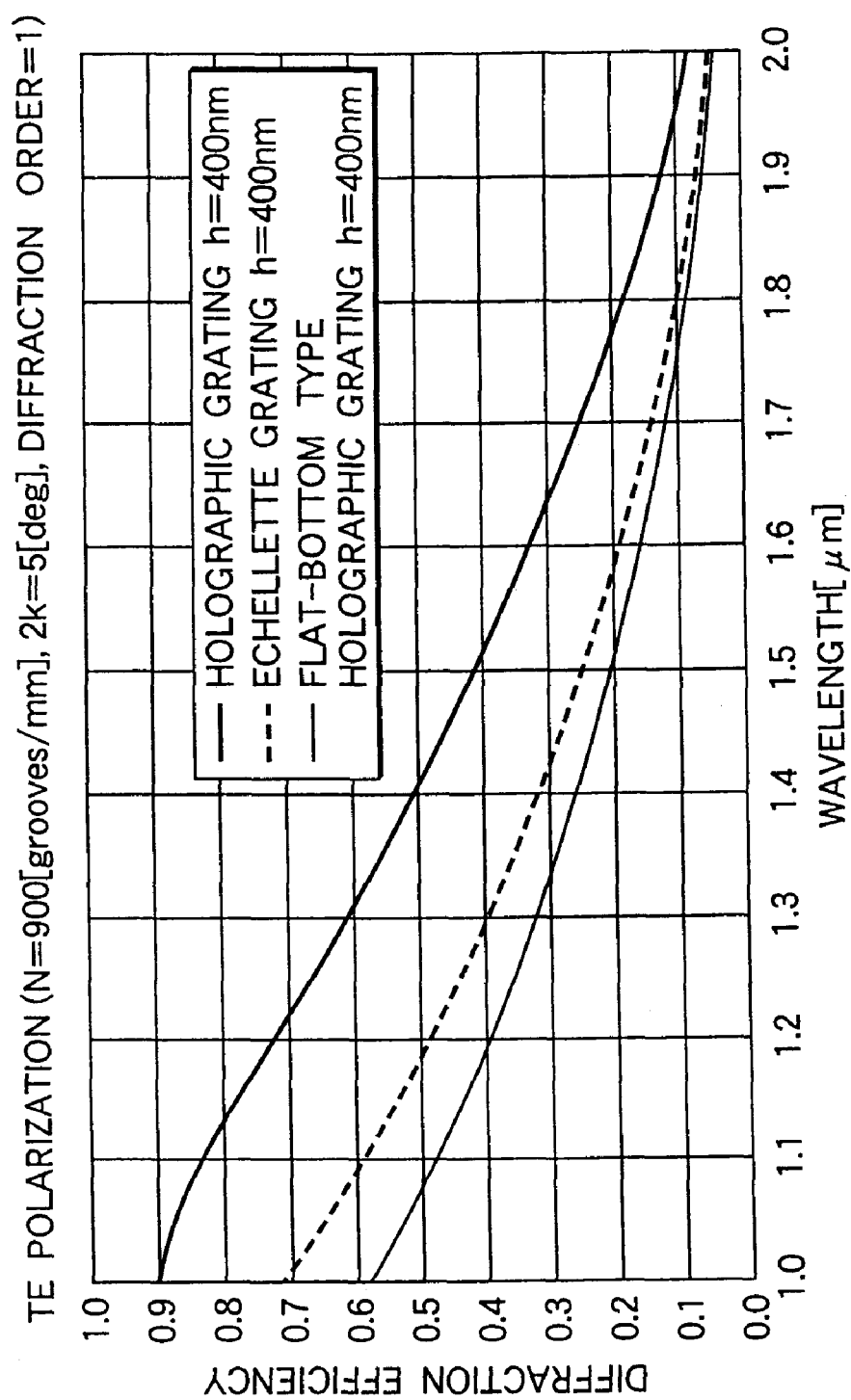
FIG. 3 is a diffraction efficiency simulation drawing based on TE polarization of the gratings according to the present invention.
Figure 4:
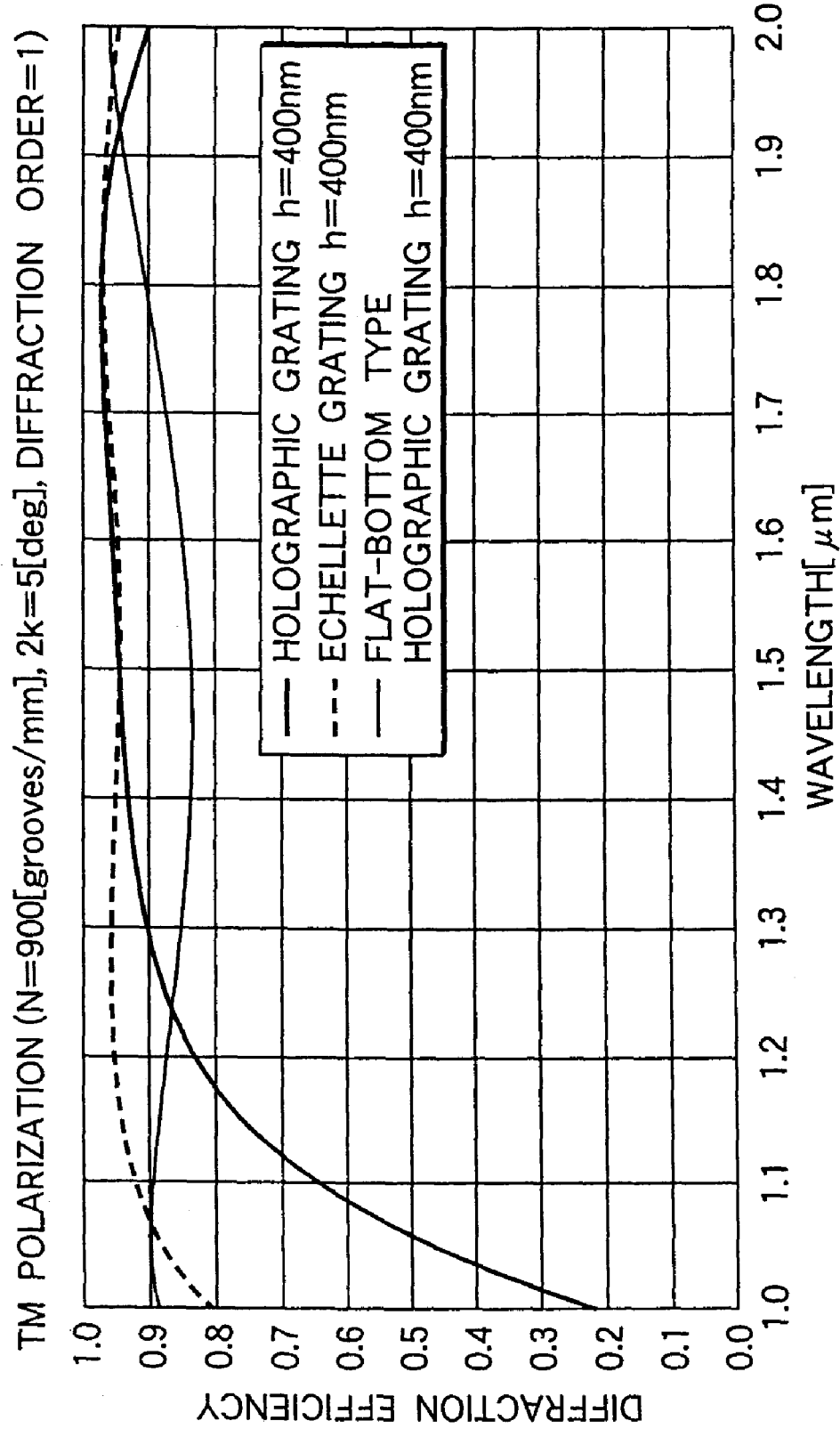
FIG. 4 is a diffraction efficiency simulation drawing based on TM polarization of the gratings according to the present invention.
Figure 5:
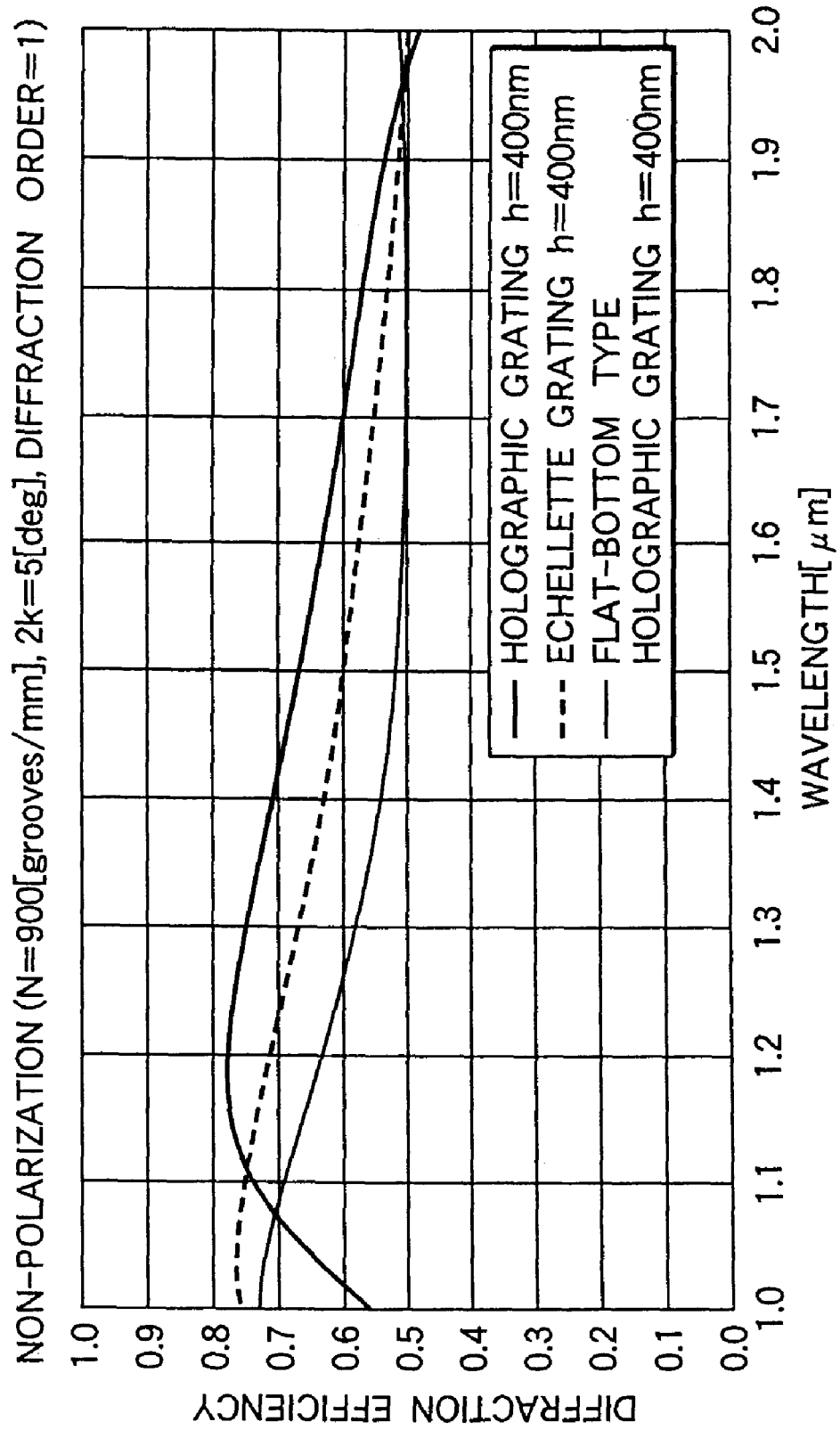
FIG. 5 is a diffraction efficiency simulation drawing based on non-polarization of the gratings according to the present invention.

FIGS. 3 to 5 show the simulation results of diffraction efficiency by polarization, of the echellette grating and the holographic grating based on the resonance theory and the holographic grating of flat bottom type manufactured in the embodiment of the present invention. The simulation conditions are follows: Number of grooves (N)=900/mm; 2K=5 degrees; diffraction order=1; and groove depth (h)=400 nm. The simulation results show that the holographic grating of flat bottom type is very excellent in TE, TM and non-polarizations. As compared with this, the simulation results of the echellette grating are difference in TE, TM and non-polarizations. This proves that variations in manufacturing the holographic gratings of flat bottom type are small and that the holographic gratings of flat bottom type are also excellent in quality more than the echellette gratings. Therefore, the holographic gratings of flat bottom type are also excellent in manufacturing time period and costs more than the gratings in the related arts.

Figure 1E:
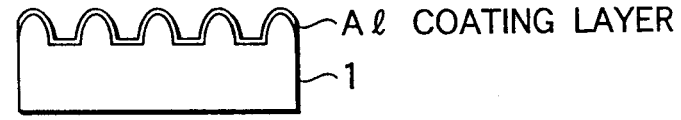

Next, the original grating whose etching is complete is cleaned and then is coated with an optimum material in the used wavelength range in a vacuum evaporation apparatus (FIG. 1E). The original grating itself can be used without any coating if the reflection coefficient of the original grating is sufficiently high in the used wavelength region. If the wavelength region where the reflection coefficient of the original grating is not high is used, the original grating is coated with gold (Au), platinum (Pt), a X-ray multilayer film, or the like as required, thereby raising the reflection coefficient and durability of the grating for the used wavelength. In the embodiment, the original grating was coated with aluminum (Al) having a comparatively high reflection coefficient in wavelengths from an ultraviolet region to an infrared region.

Figure 1F:
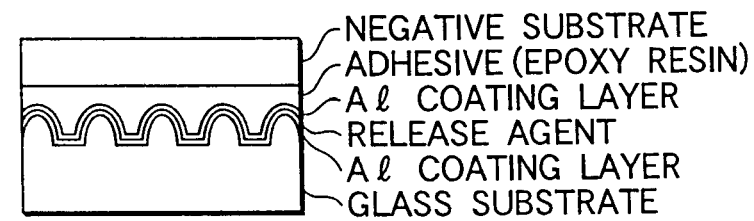

Subsequently, methods of manufacturing negative and replica gratings from the original grating will be discussed (FIG. 1F). A thin oil film (about 1 nm thick) of silicone grease, etc., for example, as a release agent is formed on the original grating coated with Al in the vacuum evaporation apparatus. Subsequently an aluminum thin film (about 0.2 µm thick) is formed on the thin oil film by a vacuum deposition. Then, after the original grating is taken out from the vacuum evaporation apparatus, a negative substrate, such as a glass substrate, is bonded to the aluminum thin film with an adhesive.

In the embodiment, the epoxy resin was adopted as the adhesive, but the adhesive is not limited to the epoxy resin and urea resin, melanin resin, phenol resin, etc., of heat-resistant thermosetting resin may be used. If BENEF IX VL (manufactured by Ahderu Co. Ltd.), etc., is used, the effect of thermal distortion can be lessened. Elastic adhesive EP-001 (manufactured by Cemedain), etc., can also be used.

Figure 1G:
Figure 1H:

If the negative substrate is parted from the original grating (master block) after the adhesive is hardened, the negative substrate is parted together with the release agent as the boundary. Then, after the negative substrate is parted, the release agent remaining on the surface of the negative substrate is cleaned with a solvent of Freon, etc., for removal. The negative grating with the grating grooves of the original grating transferred to the surface of the negative substrate is thus provided (FIG. 1G).

The replica grating manufacturing method may be similar to the negative grating manufacturing method. A release agent layer and an aluminum thin film are formed on the negative grating and a replica substrate is bonded thereto with an adhesive. After the adhesive is hardened, the replica substrate is parted from the negative grating. The groove shape of the negative grating is again inverted and is transferred to the surface of the replica grating. Consequently, the replica grating having a groove shape equal to that of the original grating is manufactured. Such a process is repeated, whereby a large number of replica gratings are manufactured. When the replica gratings for the original grating of the present invention are manufactured, the engagement force of grooves with each other is small as the groove aspect ratio is small, and a release agent sufficiently reaches the groove bottom as the groove bottom is large. Therefore, it is possible to prevent the problems at the parting, such as chipped grating grooves, degraded performance of the grating. The embodiment can be modified whenever necessary based on a known manufacturing method and a known copy method.

Figure 6:
FIG. 6 is a cross section to show a grating having a groove cross section shaped as a half sawtooth with a flat top according to the present invention.

In the embodiment, the grating has the groove cross section shaped as a half sinusoidal wave. The prevent invention is not limited to such a grating. The grating of the present invention may have a groove cross section shaped like a half sawtooth, or a half sawtooth with a flat top as shown in FIG. 6.

In the case of a wavelength region wherein the wavelength is the same degree as or more than the groove cycle, in the echellette and holographic gratings in the related arts, it is difficult to provide both high diffraction efficiency of TM polarization and high diffraction efficiency of TE polarization in balance. Further, in the echellette and holographic gratings in the related arts, the groove aspect ratio becomes large, it is hard to manufacture replica gratings, the groove shape of the original grating cannot effectively be transferred, and it is difficult to supply gratings with good diffraction efficiency. On the other hand, the grating according to the present invention is of flat bottom type with the groove cross section shaped like a sinusoidal wave or a sawtooth and the groove bottom part shaped as a flat form, for example, the grating having the groove cross section shaped like a half sawtooth, a half sinusoidal wave, and a half sawtooth with a flat top. Therefore, even in the wavelength region wherein the wavelength is the same degree as or more than the groove cycle, both diffraction efficiency of TM polarization and that of TE polarization can be provided high in balance. Further, for the grating of the present invention, replica gratings can be manufactured more easily than these of the echellette and holographic gratings in the related arts, and thus it is made possible to manufacture a bright spectroscope with a high resolution at a low cost. Particularly, a high-resolution grating excellent in efficiency in a 1.2 to 1.7-µm band useful for optical communications can be provided.

What is claimed is:

1. A method of manufacturing a grating, comprising:

forming a photoresist layer on a glass substrate;

subjecting the photoresist layer to a holographic exposure so as to have portions each of which has a half sinusoidal cross section; and performing an ion beam etching with either mix gas of fluorine-family gas and argon gas or mix gas of fluorine-family gas and oxygen gas, until the photoresist layer is disappeared and grooves each of which has a flat bottom are formed on the glass substrate to constitute a grating pattern with a shape of a half sinusoidal wave.

2. The method as set forth in claim 1, wherein:

the ion beam etching is performed such that a portion between any adjacent ones of the grooves has a half sinusoidal cross section.

3. The method as set forth in claim 1, wherein:

the ion beam etching is performed such that a portion between any adjacent ones of the grooves has a trapezoidal cross section.

4. The method as set forth in claim 1, wherein:

the ion beam etching is performed such that the grating pattern has a value obtained by dividing a cycle of the grooves with a wavelength of light to be incident on the grating is less than 5.

5. The method as set forth in claim 1, wherein:

the ion beam etching is performed such that a duty ratio of a width of each of the grooves to a cycle of the grooves is 0.5.

6. The method as set forth in claim 1, further comprising:

coating the grating pattern with a first release agent;

adhering a negative substrate such that a first adhesive agent is provided between the negative substrate and the first release agent; hardening the first adhesive agent; and separating the negative substrate from the grating pattern to obtain a negative grating pattern formed with the hardened first adhesive agent.

7. The method as set forth in claim 6, further comprising:

coating the negative grating pattern with a second release agent;

adhering a replica substrate such that a second adhesive agent is provided between the replica substrate and the second release agent;

hardening the second adhesive agent; and separating the replica substrate from the negative grating pattern to obtain a replica grating pattern formed with the hardened second adhesive agent.

* * * * *